United States Patent
Isoyama

(10) Patent No.: US 8,255,109 B2
(45) Date of Patent: Aug. 28, 2012

(54) RELAY CONNECTION UNIT AND VEHICLE-MOUNTED COMMUNICATION SYSTEM

(75) Inventor: Yoshikazu Isoyama, Yokkaichi (JP)

(73) Assignees: Autonetworks Technologies, Ltd., Mie (JP); Sumitomo Wiring Systems, Ltd., Mie (JP); Sumitomo Electric Industries, Ltd., Osaka (JP)

( * ) Notice: Subject to any disclaimer, the term of this patent is extended or adjusted under 35 U.S.C. 154(b) by 334 days.

(21) Appl. No.: 12/312,213

(22) PCT Filed: Nov. 19, 2007

(86) PCT No.: PCT/JP2007/072366
§ 371 (c)(1),
(2), (4) Date: May 12, 2009

(87) PCT Pub. No.: WO2008/062747
PCT Pub. Date: May 29, 2008

(65) Prior Publication Data
US 2010/0042290 A1    Feb. 18, 2010

(30) Foreign Application Priority Data

Nov. 21, 2006 (JP) .................................. 2006-314348

(51) Int. Cl.
*G06F 11/00* (2006.01)
*G06F 11/30* (2006.01)
(52) U.S. Cl. .................................................... 701/29.1
(58) Field of Classification Search .................... 701/29, 701/35, 36, 29.1, 30.4, 32.7, 33.6, 34.4
See application file for complete search history.

(56) References Cited

U.S. PATENT DOCUMENTS
4,652,853 A * 3/1987 Tagami et al. ............... 307/10.1
(Continued)

FOREIGN PATENT DOCUMENTS
JP    A-2003-143164    5/2003
(Continued)

OTHER PUBLICATIONS

Shinichi Iiyama et al., "Response Time Analysis for Grouped CAN Messages with Offsets," Information Processing Society of Japan, vol. 45, No. SIG 11(ACS 72); pp. 455-464; 2004; with abstract.

*Primary Examiner* — Eric Culbreth
*Assistant Examiner* — Barry Gooden, Jr.
(74) *Attorney, Agent, or Firm* — Oliff & Berridge, PLC

(57) ABSTRACT

A Relay connection unit connects networks connected to ECUs via multiple communication lines and relays signals transmitted/received between the ECUs belonging to the different networks. The relay connection unit comprises a recording part that records the relationship between ECUs that currently transmit/receive signals to/from each other; a buffer part that records transmission completion times at which the relay connection unit transmits signals received from ECUs to the networks to which other ECUs of relay destination belong; and a communication abnormality determining part that determine a time difference (T) between the transmission completion time corresponding to a network, for which the signal transmission has been completed the earliest, and each of the transmission completion times corresponding to the other networks for which signal transmissions have been completed and that determines that the signal transmission to a network for which the corresponding time difference is equal to or greater than a predetermined time is a communication delay.

12 Claims, 4 Drawing Sheets

U.S. PATENT DOCUMENTS

| | | | |
|---|---|---|---|
| 6,405,337 B1 * | 6/2002 | Grohn et al. | 714/749 |
| 7,729,827 B2 * | 6/2010 | Sakurai et al. | 701/31.7 |
| 7,995,504 B2 * | 8/2011 | Ransom et al. | 370/272 |
| 2003/0055942 A1 * | 3/2003 | Senoo et al. | 709/223 |
| 2005/0187681 A1 * | 8/2005 | Suzuki et al. | 701/29 |
| 2006/0007863 A1 * | 1/2006 | Naghian | 370/238 |
| 2009/0147806 A1 * | 6/2009 | Brueckheimer | 370/503 |
| 2010/0332072 A1 * | 12/2010 | Ishiko et al. | 701/30 |
| 2011/0105017 A1 * | 5/2011 | Takada et al. | 455/18 |

FOREIGN PATENT DOCUMENTS

JP    A-2006-191339    7/2006

* cited by examiner

RELAY CONNECTION UNIT AND VEHICLE-MOUNTED COMMUNICATION SYSTEM

TECHNICAL FIELD

The present invention relates to a relay connection unit mounted on a vehicle and a communication system, mounted on a vehicle, which has the relay connection unit. More particularly the present invention is intended to detect transmission delay of signals relayed by the relay connection unit (gateway unit) interposed between networks.

BACKGROUND ART

In recent years, the number of electric parts and that of electric apparatuses mounted on a vehicle have rapidly increased owing to the fact that the vehicle has come to have a high function and a high performance. Therefore wiring inside the vehicle has become complicated and large-scaled.

To suppress an increase of the number of wires inside the vehicle, a multiple communication system is increasingly adopted. In the multiple communication system, electronic control units (hereinafter referred to as ECU) for controlling electric parts mounted on the vehicle are divided into a group for the vehicle body such as a seat, a door, and the like and another group for the power train such as an engine, a throttle, and the like. The ECUs of each group are connected to one another via multiple communication lines to construct a network so that the number of wires is decreased. Further a relay control unit (gateway unit) for relaying signals transmitted and received between the ECUs belonging to different networks is interposed between the networks.

When any one of a plurality of the ECUs connected to the multiple communication line fails to generate communication abnormality, it may cause interference with the control of the operation of a vehicle and electric parts. Therefore it is preferable to rapidly start an operation of coping with the communication abnormality by specifying the ECU which has generated the communication abnormality in an early stage.

As disclosed in Japanese Patent Application Laid-Open No. 2003-143164 (patent document 1), the ECU having the communication abnormality determining part which determines whether the communication abnormality has occurred is proposed. Each ECU transmits signals cyclically to the multiple communication lines. Thus each ECU measures an elapsed period of time from the time when the ECU receives the signal from other ECU until the ECU receives a signal subsequently transmitted from the other ECU. When the elapsed period of time is larger than the predetermined specified time, the communication abnormality determining part determines that a communication delay or communication stop has occurred and that the communication abnormality has occurred.

Patent document 1: Japanese Patent Application Laid-Open No. 2003-143164

DISCLOSURE OF THE INVENTION

Problems to be Solved by the Invention

But in the determination executed by utilizing the elapsed period of time from the time when the ECU receives the signal previously transmitted until the ECU receives the signal currently transmitted, as disclosed in the patent document 1, when the ECU having the communication abnormality determining part receives signals at constant cycles but behind time, as shown in FIG. 4(B), the ECU detects the communication abnormality when it receives a signal initially delayed. But thereafter the ECU receives delayed signals cyclically. Thus the determination proposed in the patent document has a problem that the communication abnormality cannot be detected.

As disclosed in the patent document 1, because each ECU obtaining signals determines whether communication abnormality has occurred, it is necessary to provide all ECUs of the multiple communication system with the communication abnormality determining part. Particularly in the case of the multiple communication system in which a plurality of multiple communication lines is connected with the relay connection unit, the number of the ECUs is large. Thus a large number of ECUs executes the same processing of determining whether communication abnormality has occurred, which is inefficient.

The present invention has been made in view of the above-described problems. It is an object of the present invention to detect communication delay and communication abnormality at an early stage, even when delayed signals are transmitted cyclically by a relay connection unit interposed between networks with which electronic control units are connected via communication lines.

Means for Solving the Problem

To solve the above-described problems, the present invention provides a relay connection unit, mounted on a vehicle, which is interposed between networks connected with electronic control units via communication lines and which relays data signals transmitted and received between the electronic control units belonging to different networks, including:

a buffer part which, in transmitting a data signal received from one of the electronic control units to other electronic control units belonging to a plurality of different networks respectively, records transmission completion times in transmissions of the data signal to the networks to which the other electronic control units belong respectively; and a communication abnormality determining part which, in transmission completion times recorded by the buffer part, finds a time difference between an earliest transmission completion time in transmission of a signal to one of the networks and each of transmission completion times in transmissions of the signal to other networks and determines that if the time difference is not less than a specified time, a communication delay has occurred in the transmission of the signal thereto.

As described above, in the present invention, when the relay connection unit transmits the same data signal to a plurality of the networks, the buffer part records transmission completion times in the transmissions of the data signal to the networks. Based on the recorded transmission completion times, the communication abnormality determining part finds the time difference between the earliest transmission completion time in the transmission of the signal to one of the networks and the transmission completion times in the transmissions of the signal to other networks. If the time difference is not less than the specified time, the communication abnormality determining part determines that the communication delay has occurred in the transmission of the signal to the other networks, thus detecting the occurrence of the communication abnormality.

As described above, because the relay connection unit which relays the data signal to the networks determines whether the communication abnormality has occurred, it is possible to determine whether the communication abnormality has occurred at one position. Particularly unlike the construction of the patent document 1 of providing each ECU with the communication abnormality determining part, in the present invention, it is unnecessary for each ECU to execute the same processing. Thus it is possible to efficiently determine whether the communication abnormality has occurred.

In the patent document 1, when each ECU receives delayed signals at constant cycles, the occurrence of the communication abnormality cannot be detected. On the other hand, in the present invention, the relay connection unit determines whether the communication abnormality has occurred by using the time difference between the transmission completion times in the transmissions of the signal to the networks. Therefore even when the delayed signal is relayed to a same network at constant cycles, it is possible to determine whether the communication abnormality has occurred.

It is preferable that the relay connection unit comprises a recording part which, when the communication abnormality determining part determines that the communication delay has occurred, records the communication delay as abnormality.

When the communication abnormality is generated in a signal which is not concerned with the safety of travel of a vehicle and for which it is unnecessary to instantaneously perform an operation for coping with the communication abnormality, it is possible to cope with the communication abnormality after travel finishes by recording the communication abnormality in the recording part.

It is preferable that data transmitted and received between the networks is divided into data for determining whether the communication delay has occurred and data not for determining whether the communication delay has occurred and that the data for determining whether the communication delay has occurred includes any one of a number of rotations of an engine, a number of rotations of a tire, a rotational angle of a handle, and an acceleration sensor detection information.

That is, it is unnecessary to use all data transmitted and received by the relay connection unit as data for determining whether the communication delay has occurred. But the data for determining whether the communication delay has occurred may be limited to data concerned with the safety of travel. The data of an audio operation command, an air conditioner operation command, radio station selection information, driver detection information, and the like does not pose a problem, even though the communication delay occurs. Therefore it is possible not to use such data to detect the communication delay so that a load to be applied to the relay connection unit can be decreased.

The present invention provides a communication system, mounted on a vehicle, in which the relay connection unit is connected with the networks.

It is preferable that the networks connected with one another via the relay connection unit are connected with a plurality of electronic control units via multiple communication lines and connected with the relay connection unit via the multiple communication lines.

The communication system mounted on a vehicle efficiently detects the occurrence of the communication abnormality such as delay or stop of a signal and is capable of reliably detecting the occurrence of the communication abnormality, even when delayed signals are cyclically transmitted. Because the communication system is capable of detecting the delay of a data signal concerned with the safety of travel without delay, the communication system can be utilized as a multiple communication system capable of contributing to the safety of a vehicle body.

The network connected with other networks via the relay connection unit is not limited to the above-described construction in which a plurality of the electronic control units are connected with the network via the multiple communication lines, but the network may be so constructed that one electronic control unit is connected with the relay connection unit via a communication line.

Effect of the Invention

As described above, the relay connection unit of the present invention is capable of determining whether the communication delay has occurred in each network of the communication system and thus efficiently determining whether the communication abnormality has occurred. Further in the present invention, the relay connection unit determines whether the communication abnormality has occurred by using the time difference between the transmission completion times in the transmissions of a signal to the networks. Therefore even when the delayed signal is relayed to a same network at constant cycles, it is possible to determine whether the communication abnormality has occurred.

The communication system mounted on a vehicle in which the relay connection unit is interposed between the networks efficiently detects the occurrence of the communication abnormality such as a delay and the like of a signal and is capable of reliably detecting the occurrence of the communication abnormality, even when the delayed signals are cyclically transmitted. Because the communication system is capable of detecting the communication delay of data concerned with the safety of travel, the communication system can be utilized as the vehicle communication system capable of contributing to the safety of the vehicle body.

EXPLANATION OF REFERENCE NUMERALS AND SYMBOLS

Figure 1:
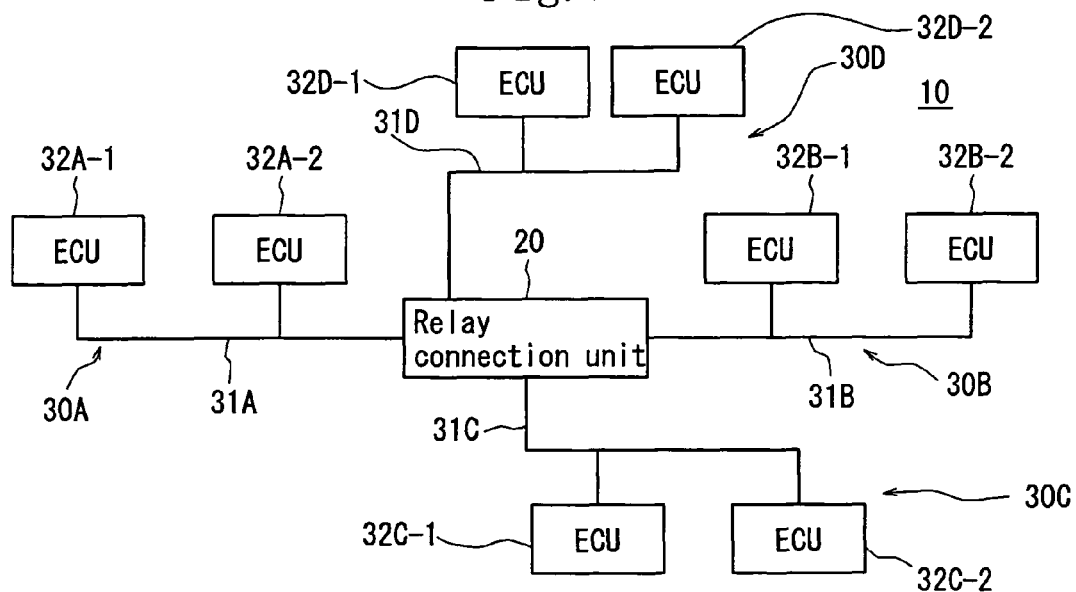
FIG. 1 is a construction view of a multiple communication system showing a first embodiment of the present invention.
Figure 2:
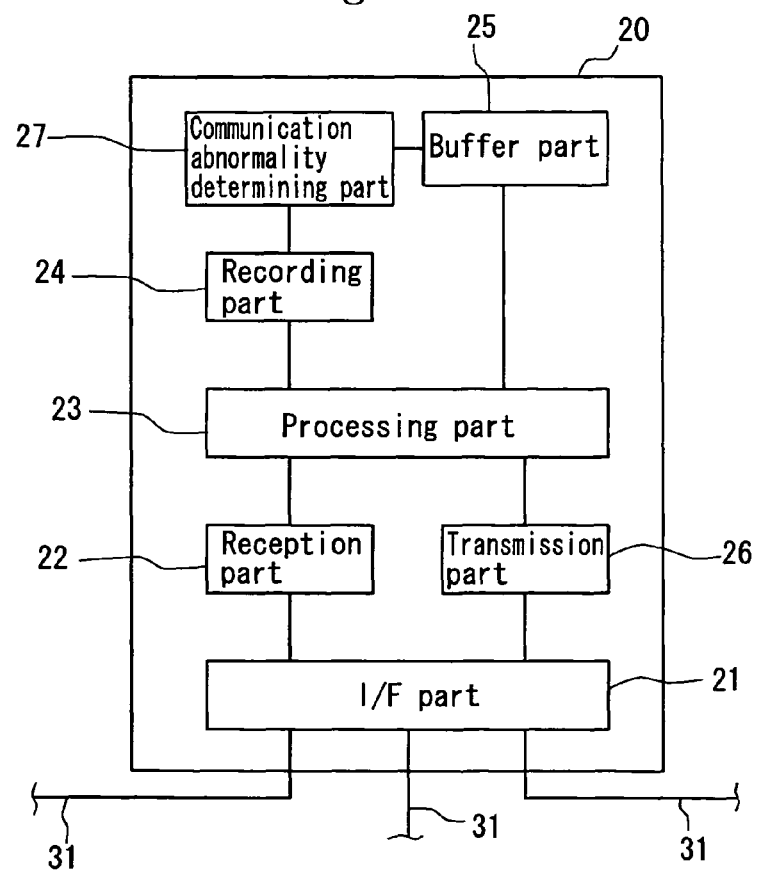
FIG. 2 is a construction view of a relay connection unit
Figure 3:
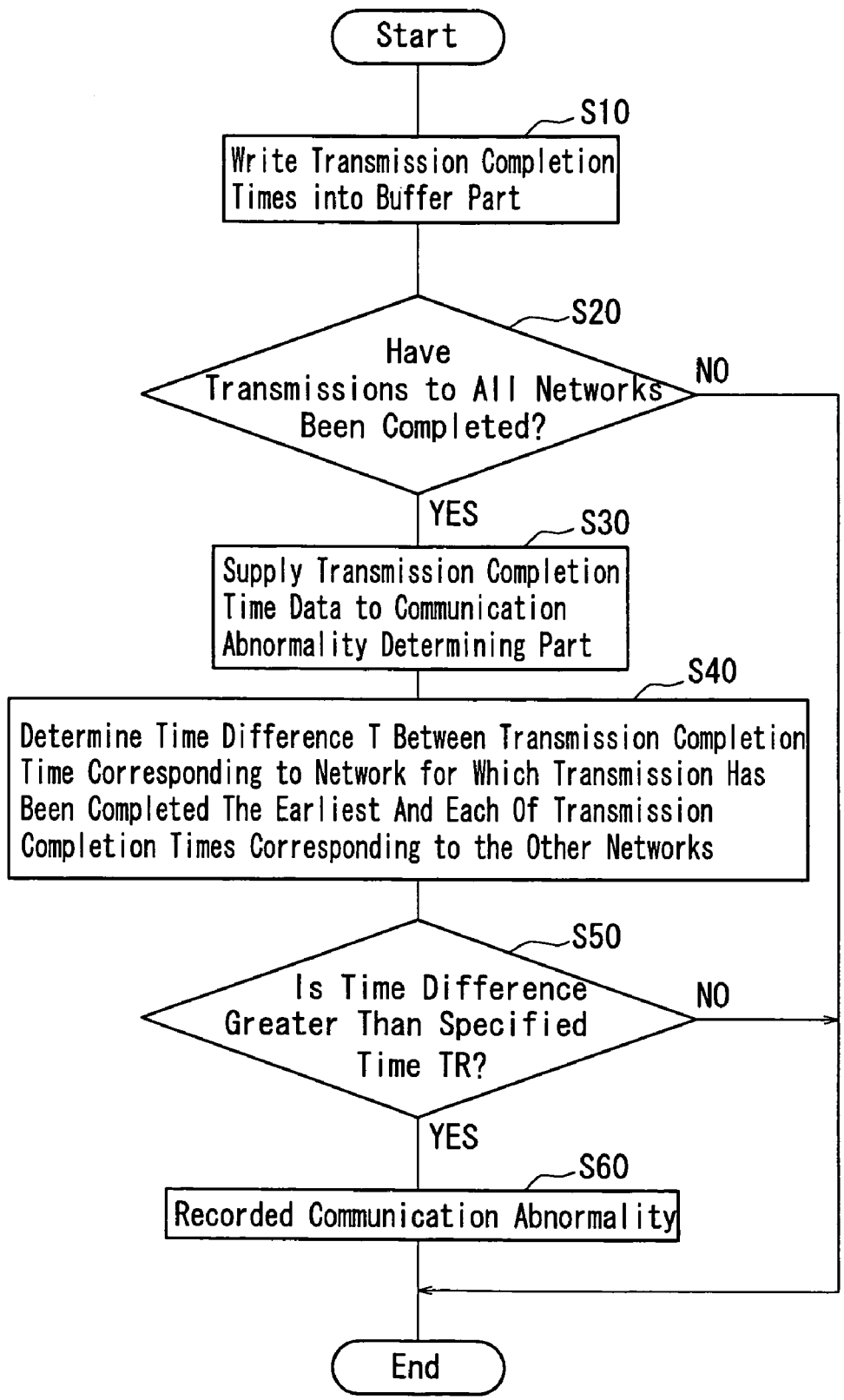
FIG. 3 is a flowchart showing the operation of the relay connection unit.

10: communication system mounted on vehicle
20: relay connection unit
22: reception part
23: processing part
24: recording part
25: buffer part
26: transmission part
27: communication abnormality determining part
30 (30A, 30B, 30C, 30D): network
31 (31A, 31B, 31C, 31D): communication line
32 (32A, 32B, 32C, 32D): ECU
T: time difference
TR: specified time

BEST MODE FOR CARRYING OUT THE INVENTION

The embodiments of the present invention are described below with reference to the drawings.

FIGS. 1 through 4 show a first embodiment of the present invention.

FIG. 1 shows the construction of a multiple communication system 10 mounted on a vehicle.

In the multiple communication system 10, a relay connection unit 20 (gateway unit) is connected to bus-type first through fourth networks 30 (30A through 30D). In the first embodiment, to simplify description, the number of networks is set to four.

Each of the networks 30 (30A through 30D) is connected to a plurality of ECUs 32 through a multiple communication line 31 (31A through 31D).

That is, in the first network 30A, ECUs 32A-1 and 32A-2 are connected with the multiple communication line 31A. Similarly in the second network 30B, ECUs 32B-1 and 32B-2 are connected with the multiple communication line 31B. In the third network 30C, ECUs 32C-1 and 32C-2 are connected with the multiple communication line 31C. In the fourth network 30D, ECUs 32D-1 and 32D-2 are connected with the multiple communication line 31D. The number of the ECUs 32 connected to each network 30 is not limited to a specific number, but may be one or not less than three.

The relay connection unit 20 relays signals transmitted and received between the ECUs 32 (32A through 32D) of different networks 30 (30A through 30D). For example, the relay connection unit 20 relays signals transmitted and received between the ECU 32A-1 of the first network 30A and the ECU 32B-1 of the second network 30B.

In the communication protocol of the multiple communication system 10 of the first embodiment, a CAN protocol is used. As an access method, CSMA/CA is adopted. The maximum communication speed is set to 1 Mbps.

For example, the ECU 32A-1 that controls the number of rotations of an engine and the ECU 32A-2 that controls the number of rotations of a tire are connected with the first network 30A.

The ECU 32B-1 which transmits acceleration sensor information and the ECU 32B-2 which detects a rotational angle of a handle are connected with the second network 30B. The ECU 32C-1 which controls audio operation command information and the ECU 32C-2 which controls the state of doors are connected with the third network 30C. The ECU 32D-1 which detects driver detection information and the ECU 32D-2 which controls radio station selection information are connected with the fourth network 30D. The above-described example is one example, and each ECU 32 is not limited to the above-described ECU 32.

Signals of the rotational angle of the handle and the like transmitted from the ECUs 32A and 32B connected with the first network 30A and the second network 30B respectively are concerned with safety in travel and are necessary for controlling a vehicle body. Therefore much delay is not allowed in the transmission and reception of signals between the ECU 32 connected with other network 30 and the ECU 32A as well as 32B. On the other hand, because signals transmitted from the ECU 32C and the ECU 32D connected with the third network 30C and the fourth network 30D respectively are not concerned with the safety in the travel, communication abnormality is not detected for these signals. Whether the communication abnormality has occurred may be determined by setting a specified time TR for the signals transmitted from the ECU 32C and the ECU 32D larger than the specified time TR for the signals concerned with the safety of the travel.

The relay connection unit 20 of the present invention has an I/F part 21 connected with the multiple communication lines 31 of the networks 30 and constituting an interface, a reception part 22 for executing reception processing of signals transmitted from the multiple communication lines 31 connected with the I/F part 21, a transmission part 26 for executing transmission processing of signals to be transmitted to the multiple communication lines 31 connected with the I/F part 21, a recording part 24, a processing part 23, a buffer part 25, and a communication abnormality determining part 27.

The recording part 24 records the relationship between the ECU 32 and the other ECUs 32 between which the above-described signal is transmitted and received and also records the communication abnormality, when the communication abnormality determining part 27 determines that the communication abnormality has occurred.

The processing part 23 is connected with the recording part 24 and with reference to the recording part 24 specifies the networks 30 to which the other ECUs 32 belong and to which the signal received from the reception part 22 is transmitted via the transmission part 26.

The buffer part 25 is connected with the processing part 23 and records transmission completion times t in the transmission of the signal received from the ECU 32 to the networks 30 to which the other ECU 32 belong respectively.

The communication abnormality determining part 27 is connected with the buffer part 25 and reads the transmission completion times t recorded by the buffer part 25. In the networks 30 to which the signal has been transmitted, the communication abnormality determining part 27 finds a time difference between the earliest transmission completion time t at which the transmission of the signal to one of the networks 30 has been completed and transmission completion times t at which the transmissions of the signal to other networks 30 have been completed. If the time difference in the transmission of the signal to the network 30 is not less than the specified time TR, the communication abnormality determining part 27 determines that a communication delay has occurred in the transmission of the signal to the network 30. In addition, the communication abnormality determining part 27 is connected with the recording part 24, thus recording results of determinations.

The method of the present invention of detecting the communication abnormality is described below.

For example, in transmitting a data signal transmitted from the ECU 32A-1 of the first network 30A to the second network 30B, the third network 30C, and the fourth network 30D to which the ECU 32B-1, ECU 32C-1, ECU 32D-1 belong respectively, the buffer part 25 records transmission completion times t1, t2, and t3 in the transmissions of the signal to the networks 30B, 30C, and 30D. The communication abnormality determining part 27 reads the transmission completion times t1, t2, and t3 recorded by the buffer part 25. Supposing that the network to which the signal has been transmitted earliest is the second network 30B, the communication abnormality determining part 27 finds a time difference t2−t1 between the transmission completion time t2 in the transmission of the signal to the third network 30C and the earliest transmission completion time t1 in the transmission of the signal to the second network 30B and a time difference t3−t1 between the transmission completion time t3 in the transmission of the signal to the fourth network 30D and the earliest transmission completion time t1 in the transmission of the signal to the second network 30B, thus comparing the time differences t2−t1 and t3−t1 with the specified time TR set beforehand. When the time difference t2−t1 is larger than the specified time TR, the communication abnormality determining part 27 determines that the transmission of the signal to the third network 30C has been delayed and that communication abnormality has occurred. Similarly when the time difference t3−t1 is larger than the specified time TR, the communication abnormality determining part 27 determines that the transmission of the signal to the fourth network 30D has been delayed.

More detailed description is made below by using a flowchart.

At step S10, the processing part 23 transmits a data signal S1 transmitted from the ECU 32A-1 of the first network 30A to the second network 30B and writes the transmission completion time t1 of the signal S1 to the buffer part 25. Similarly the processing part 23 transmits the signal S1 to the third network 30C, writes the transmission completion time t2 of the signal S to the buffer part 25, and transmits the signal S1 to the fourth network 30D and writes the transmission completion time t3 of the signal S1 to the buffer part 25.

Thereafter at step S20, the processing part 23 determines whether the signal S1 has been transmitted to all the networks 30 recorded by the recording part 24. If the signal S1 has not been transmitted to all the networks 30, an operation of detecting whether the communication abnormality has occurred finishes, and the signal S1 is transmitted to the network 30 to which the signal S1 has not been transmitted. If the signal S1 has been transmitted to all the networks 30, the program goes to step S30.

At step S30, the communication abnormality determining part 27 reads the data of the transmission completion times t1, t2, and t3, recorded in the buffer part 25, at which the transmissions of the signal S1 to the second network 30B through the fourth network 30D have been completed.

Figure 4A:
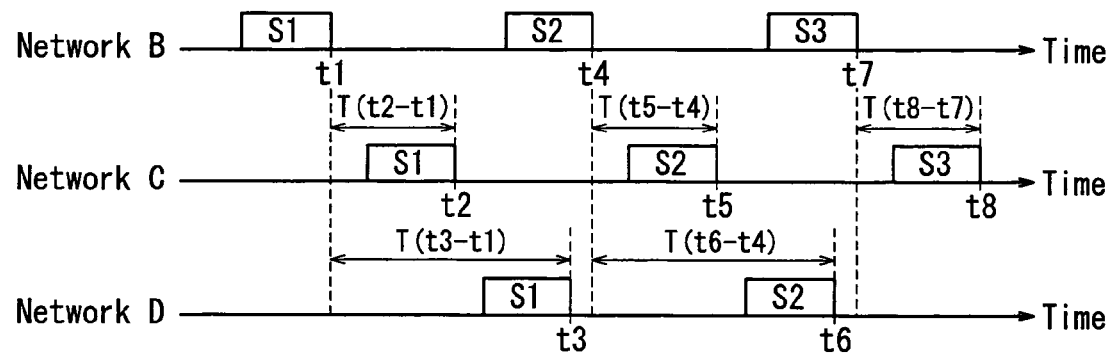
FIG. 4 is a time chart showing transmission of signals to networks.
Figure 4B:
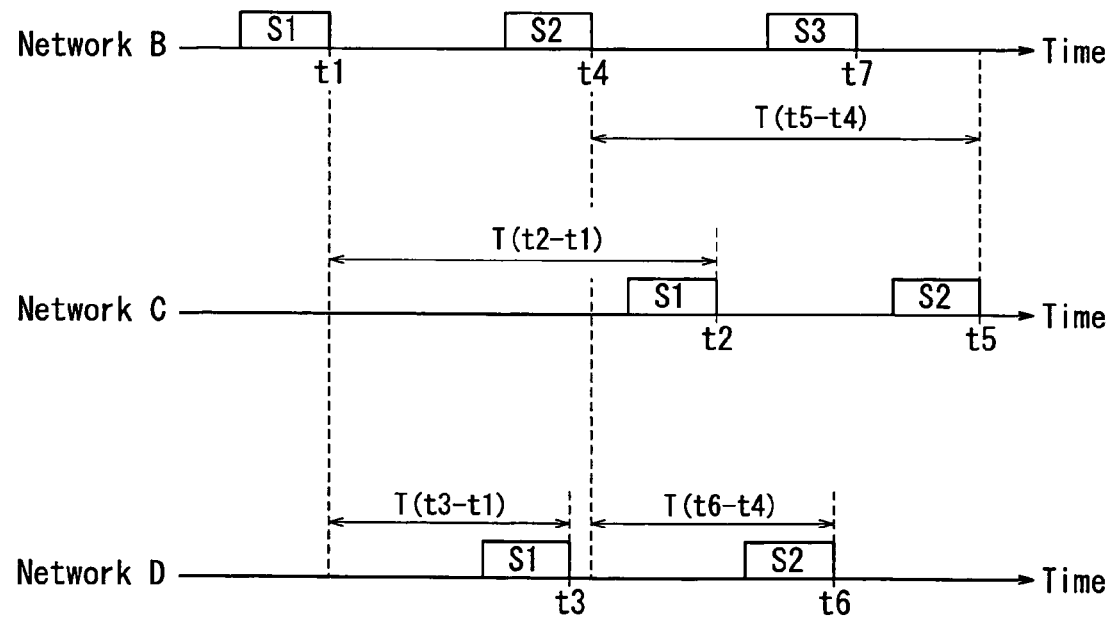

At step S40, in the transmission completion times t1, t2, and t3 at which the transmissions of the signal S1 to the second through fourth networks 30B, 30C, and 30D have been completed, the communication abnormality determining part 27 finds a time differences T between the transmission completion time t1 at which the transmission of the signal S1 to the network 30 has been earliest completed and the transmission completion times t2 as well as t3 at which the transmissions of the signal S1 to other networks have been completed. In FIG. 4, because the transmission completion time t1 at which the transmission of the signal S1 to the second network 30B has been completed is earliest, the time difference T between the transmission completion time t1 at which the transmission of the signal S1 to the second network 30B has been completed and the transmission completion time t2 at which the transmission of the signal S1 to the third network 30C has been completed and the time difference T between the transmission completion time t1 at which the transmission of the signal S1 to the second network 30B has been completed and the transmission completion time t3 at which the transmission of the signal S1 to the fourth network 30D has been completed are t2−t1 and t3−t1 respectively.

At step S50, the communication abnormality determining part 27 compares the specified time TR set beforehand and the time difference T with each other. When the time difference T is larger than the specified time TR, the communication abnormality determining part 27 determines that the communication abnormality has occurred. For example, in FIG. 4(B), when the communication delay has occurred in the second network 30B and the time difference (t2−t1) is larger than the specified time TR, the communication abnormality determining part 27 determines that the communication abnormality has occurred in the second network 30B.

The specified time TR is decided in dependence on an allowed extent of delay in the transmission of the signal S1 to be received by the ECU 32. For example, because the ECU 32C-1 connected with the third network 30C and transmitting the signal S1 controls the audio operation command information, some extent of delay in the transmission of the signal S1 to be received by the ECU 32 connected with the first network 30A is allowed.

When the communication abnormality determining part 27 determines that the communication abnormality has occurred in the network 30, the program goes to step S60. When the time difference is not larger than the specified time TR, the communication abnormality determining part 27 determines that the communication of the multiple communication system 10 is normally executed. Thus the operation finishes.

At step S60, the communication abnormality determining part 27 records the communication abnormality in the recording part 24. By storing the hysteresis of the communication abnormality, the relay connection unit 20 executes an operation of coping with the communication abnormality.

In the above-described construction, the relay connection unit 20 determines whether the communication abnormality has occurred by using the time difference between the transmission completion times at which the transmissions of the signal to the networks have been completed. Therefore even when delayed signals are relayed to the same network 30 in constant cycles, it is possible to determine whether the communication abnormality has occurred.

Figure 5:
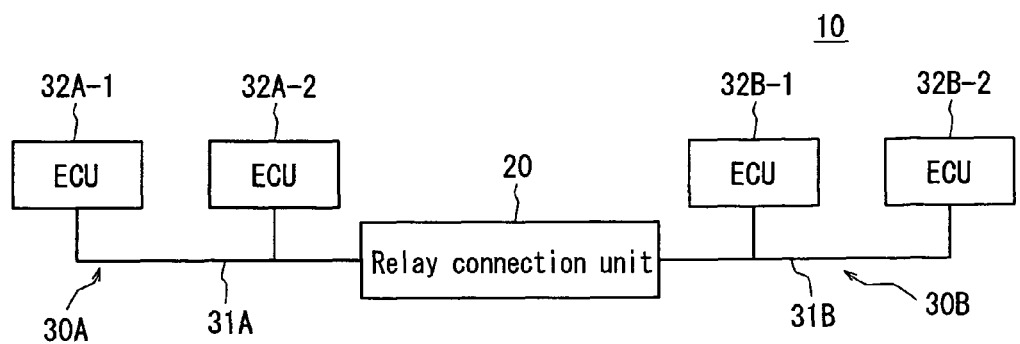
FIG. 5 is a construction view of a multiple communication system showing a second embodiment.
Figure 6A:
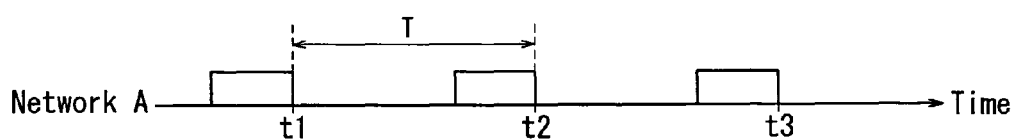
FIG. 6 is a time chart showing transmission of signals to networks.
Figure 6B:
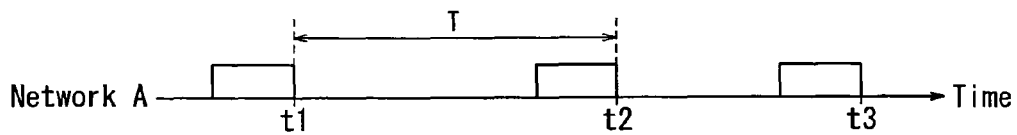

FIG. 5 shows a second embodiment.

The first network 30A and the second network 30B are connected with the relay connection unit 20. A signal transmitted from the ECU 32B connected with the second network 30B is relayed by the relay connection unit 20 and transmitted to the first network 30A.

The signal S1 is transmitted to the first network 30A. The transmission completion time t1 is recorded by the buffer part 25. The transmission completion time t2 at which the transmission of a signal subsequent to the signal S1 to the first network 30A has been completed is also recorded by the buffer part 25. The communication abnormality determining part 27 finds the time difference T between the transmission completion times t2 and t1 and compares the time difference T with the specified time TR, thus determining whether the communication abnormality has occurred.

That is, the transmission completion time of the signal transmitted to the first network 30A is constantly recorded by the buffer part 25. By finding the time difference between the transmission completion time of the signal currently transmitted to the first network 30A and the transmission completion time of the signal previously transmitted thereto, the communication abnormality determining part 27 determines whether the communication abnormality has occurred.

In the above-described construction in which two networks are connected to the relay connection unit 20, the relay connection unit 20 is capable of determining whether the communication abnormality has occurred in each network 30.

The present invention is not limited to the above-described embodiments, but includes various modes within the technical scope thereof.

What is claimed is:

1. A relay connection unit, mounted on a vehicle, which is interposed between networks connected with electronic control units via communication lines and which relays data signals transmitted and received between said electronic control units belonging to different networks of said networks, comprising:
    a reception part that receives a data signal from one of said electronic control units;
    a transmission part that transmits, from the relay connection unit, the data signal received from the one of said electronic control units to others of said electronic control units belonging to said different networks respectively;
a buffer part that records points in time at which transmissions of said data signal, to said different networks to which others of said electronic control units belong respectively, are completed, such that a plurality of points in time are recorded, each point in time relating to a respective one of the electronic control units; and
a communication abnormality determining part that uses the points in time recorded by said buffer part to find a plurality of time differences, each time difference being a difference between (i) an earliest one of the points in time and (ii) another one of the points in time, and for each time difference determines that if said time difference is not less than a specified time, a communication delay has occurred in said transmission of said data signals.

2. A communication system mounted on a vehicle, comprising:
networks; and
a relay connection unit according to claim 1, wherein the relay connection unit is connected to said networks so as to relay signals between said networks.

3. The communication system mounted on a vehicle according to claim 2, wherein said networks connected with one another via said relay connection unit are connected with a plurality of electronic control units via multiple communication lines and connected with said relay connection unit via said multiple communication lines.

4. The relay connection unit mounted on a vehicle according to claim 1, wherein said relay connection unit comprises a recording part which, when said communication abnormality determining part determines that a communication delay has occurred, records said communication delay as an abnormality.

5. The relay connection unit mounted on a vehicle according to claim 4, wherein data transmitted and received between said networks is divided into data for determining whether said communication delay has occurred and data not for determining whether said communication delay has occurred; and
said data for determining whether said communication delay has occurred includes any one of a number of rotations of an engine, a number of rotations of a tire, a rotational angle of a steering wheel, and an acceleration sensor detection information.

6. A communication system mounted on a vehicle, comprising:
networks; and
a relay connection unit according to claim 4, wherein the relay connection unit is connected to said networks so as to relay signals between said networks.

7. The communication system mounted on a vehicle according to claim 6, wherein said networks connected with one another via said relay connection unit are connected with a plurality of electronic control units via multiple communication lines and connected with said relay connection unit via said multiple communication lines.

8. The relay connection unit mounted on a vehicle according to claim 1, wherein data transmitted and received between said networks is divided into data for determining whether said communication delay has occurred and data not for determining whether said communication delay has occurred; and
said data for determining whether said communication delay has occurred includes any one of a number of rotations of an engine, a number of rotations of a tire, a rotational angle of a steering wheel, and an acceleration sensor detection information.

9. A communication system mounted on a vehicle, comprising:
networks; and
a relay connection unit according to claim 8, wherein the relay connection unit is connected to said networks so as to relay signals between said networks.

10. The communication system mounted on a vehicle according to claim 9, wherein said networks connected with one another via said relay connection unit are connected with a plurality of electronic control units via multiple communication lines and connected with said relay connection unit via said multiple communication lines.

11. A communication system mounted on a vehicle, comprising:
networks; and
a relay connection unit according to claim 8, wherein the relay connection unit is connected to said networks so as to relay signals between said networks.

12. The communication system mounted on a vehicle according to claim 11, wherein said networks connected with one another via said relay connection unit are connected with a plurality of electronic control units via multiple communication lines and connected with said relay connection unit via said multiple communication lines.

* * * * *